United States Patent
Sanchez

(10) Patent No.: US 10,627,033 B2
(45) Date of Patent: Apr. 21, 2020

(54) TRIPLE-WELD FITTING

(71) Applicant: United Technologies Corporation, Farmington, CT (US)

(72) Inventor: Christopher A. Sanchez, Charlton City, MA (US)

(73) Assignee: United Technologies Corporation, Farmington, CT (US)

( * ) Notice: Subject to any disclaimer, the term of this patent is extended or adjusted under 35 U.S.C. 154(b) by 646 days.

(21) Appl. No.: 15/255,813

(22) Filed: Sep. 2, 2016

(65) Prior Publication Data

US 2018/0066781 A1 Mar. 8, 2018

(51) Int. Cl.
*F16L 39/00* (2006.01)
*F16L 23/026* (2006.01)
(Continued)

(52) U.S. Cl.
CPC .......... *F16L 39/005* (2013.01); *B23K 31/027* (2013.01); *F01D 25/183* (2013.01); *F16L 23/026* (2013.01); *B23K 2101/06* (2018.08); *F05D 2220/32* (2013.01); *F05D 2230/232* (2013.01); *F05D 2260/98* (2013.01)

(58) Field of Classification Search
CPC ....... F16L 39/005; F16L 23/026; F16L 39/00; F16L 13/02; F16L 37/565; F16L 9/18; B23K 31/027; B23K 2101/06; B23K 2101/04; F01D 25/183; F05D 2220/32; F05D 2230/232; F05D 2260/98
USPC ......... 285/288.1, 120.1, 123.1, 123.2, 123.3, 285/285.1, 288.2, 288.3, 288.4, 286.1;
(Continued)

(56) References Cited

U.S. PATENT DOCUMENTS 2,045,493 A 6/1936 Radloff
2,763,923 A 9/1956 Webb
(Continued)

FOREIGN PATENT DOCUMENTS

DE 2458558 A1 6/1976
DE 2626813 A1 12/1977
EP 3051198 A1 8/2016

OTHER PUBLICATIONS

V.C. Chandrasekaran, Rubber Seals for Fluid and Hydraulic Systems, 2010, Elsevier, pp. 7-22 (Year: 2010).*
(Continued)

*Primary Examiner* — Anna M Momper
*Assistant Examiner* — William S. Choi
(74) *Attorney, Agent, or Firm* — Getz Balich LLC

(57) ABSTRACT

Disclosed is a method for constructing a double walled tube assembly, comprising: welding a first axial end of a first tube to a first sub-fitting of a first fitting, sliding a second tube over the first sub-fitting and the first tube, sliding a second sub-fitting of the first fitting over the first sub-fitting such that the first and second sub-fittings are co-axial, welding a first axial end of the second tube to the second sub-fitting, and welding the second sub-fitting to the first sub-fitting. An assembly includes a first fitting that includes a first sub-fitting and a second sub-fitting, a first tube having a first axial end that is welded to the first sub-fitting, and a second tube having a first axial end that is welded to the second sub-fitting, where the first tube is nested within the second tube, where the first sub-fitting is welded to the second sub-fitting.

18 Claims, 13 Drawing Sheets

(51) Int. Cl.
- *F16L 37/56* (2006.01)
- *B23K 31/02* (2006.01)
- *F01D 25/18* (2006.01)
- *B23K 101/06* (2006.01)

(58) Field of Classification Search
USPC ....... 228/126, 127, 128, 129, 130, 131, 132, 228/133, 134, 178
See application file for complete search history.

(56) References Cited

U.S. PATENT DOCUMENTS

| | | | |
|---|---|---|---|
| 3,079,179 A | 2/1963 | Niemoth | |
| 3,254,404 A | 6/1966 | Becker | |
| 3,753,287 A | 8/1973 | Ziemek | |
| 4,157,194 A * | 6/1979 | Takahashi | F16L 47/00 285/332 |
| 4,542,276 A | 9/1985 | van den Berg | |
| 5,088,774 A | 2/1992 | Spiegelman | |
| 5,129,444 A | 7/1992 | Bafford | |
| 6,662,994 B2 | 12/2003 | Jankus | |
| 7,687,928 B2 | 3/2010 | Taneja | |
| 8,596,959 B2 | 12/2013 | Durocher | |
| 8,967,237 B2 | 3/2015 | Seryi | |
| 9,238,968 B2 | 1/2016 | Harding | |
| 2005/0212285 A1 | 9/2005 | Haun | |
| 2006/0061102 A1 | 3/2006 | Wilkinson | |
| 2007/0151255 A1 | 7/2007 | Johnson | |
| 2010/0059988 A1 * | 3/2010 | Matsumoto | F16L 17/073 285/148.28 |
| 2015/0130183 A1 * | 5/2015 | Statler, III | F16L 39/005 285/123.15 |
| 2015/0219263 A1 | 8/2015 | Nowak | |
| 2015/0377065 A1 | 12/2015 | Deane | |

OTHER PUBLICATIONS

EP search report for EP17189280.5 dated Feb. 21, 2018.
FAA.gov, "Chapter 5 Aircraft Welding", available from <https://www.faa.gov/regulations_policies/handbooks_manuals/aircraft/amt_airframe_handbook/media/ama_Ch05.pdf> at least as of Aug. 31, 2016.

* cited by examiner

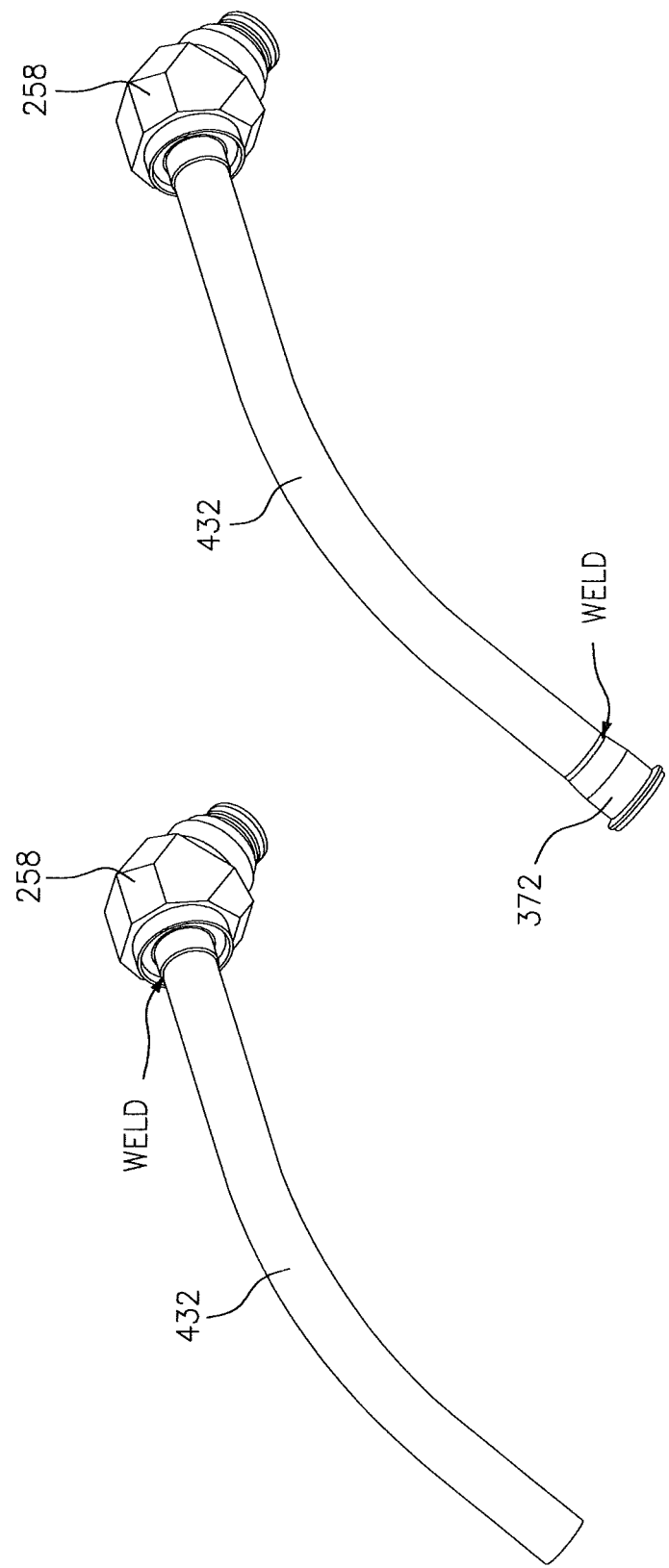

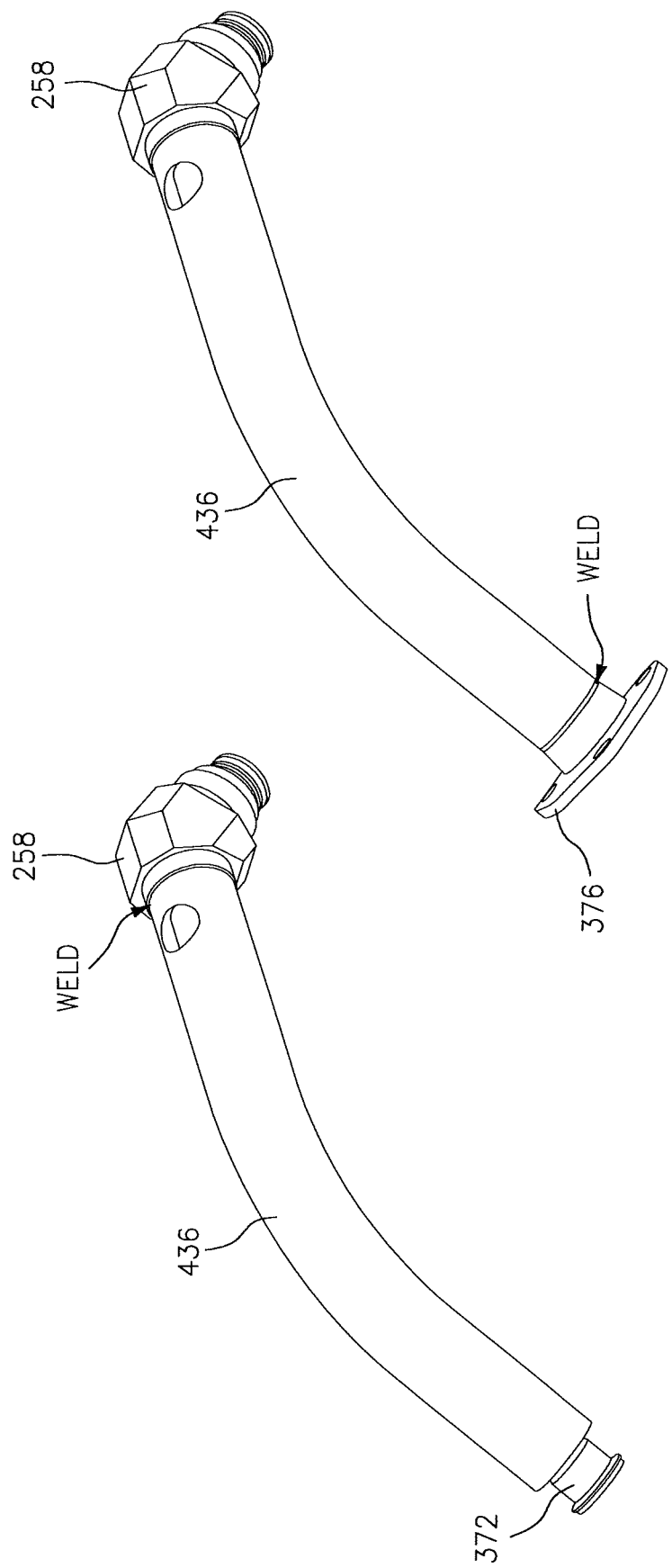

TRIPLE-WELD FITTING

BACKGROUND

Gas turbine engines, such as those which power aircraft and industrial equipment, employ a compressor to compress air that is drawn into the engine and a turbine to capture energy associated with the combustion of a fuel-air mixture. One or more fluids are typically circulated throughout the engine. For example, oil may be supplied to one or more bearings in order to clean, cool, and lubricate the bearings.

Referring to FIG. 2A, the fluids are typically conveyed from a fluid source (e.g., an oil tank) 202 to the intended destination (e.g., the bearings or an associated bearing compartment) 206 by a supply tube 210. The fluid is then returned from the destination 206 to the source 202 by a return tube 214. In this manner, a closed-loop system 200 is established. There may be other components included; the system 200 is simplified for the sake of explanation and illustrative convenience. These other components may include additional tubes beyond the tubes 210 and 214.

Referring to FIG. 2B, in order to enhance reliability and avoid a leak impacting the performance/operability of the engine, the tubes (e.g., the tube 210 or the tube 214) may be manufactured as a double walled tube 220, where the fluid is intended to be conveyed by a first tube 232. A second tube 236 serves to contain any fluid that may leak from the first tube 232. The double walled arrangement 220 shown in FIG. 2B is frequently referred to as a "tube within a tube" as the tube 236 has a larger dimension/diameter than the tube 232 and the tube 232 is contained/nested within the tube 236. In this respect, the tube 232 is an inner tube relative to the outer tube 236.

Referring to FIGS. 2C-2D, a system assembly 248 incorporating a double walled tube 220 attached to a three-flanged fitting 254 is shown (in FIG. 2C, an attachment of the double walled tube 220 to an angled, threaded fitting 258 is shown for completeness, the details of which are not pertinent to the instant disclosure), where the fitting 254 itself is formed/fabricated as a unitary piece. At an interface 262 between the inner tube 232 and the fitting 254 a brazing operation may be performed and at an interface 266 between the outer tube 236 and the fitting 254 a welding operation may be performed. Brazing may be used at the interface 262 to eliminate/minimize the likelihood that a leak path may develop. Also, the use of brazing at the interface 262 may help to keep the inner tube 232 stationary within a seat of the fitting 254.

Brazing includes strict requirements in terms of coverage and voids. Inspection of a brazed joint can be difficult or time-consuming as x-rays of the joint may be needed. Other difficulties of brazing include the possible rework of the assembly if excess braze is present at the interface 262 (or any other sealing surface). Materials used in brazing include silver braze or gold nickel braze; these materials represent an added cost to the overall construction of the assembly 248. Furthermore, a preparatory step of nickel-flashing (which may include an electrodeposition process) the inner tube 232 and the fitting 254 is performed before the brazing occurs, again representing a cost to the construction of the assembly 248.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a method for constructing a double walled tube assembly, comprising: welding a first axial end of a first tube to a first sub-fitting of a first fitting, sliding a second tube over the first sub-fitting and the first tube, sliding a second sub-fitting of the first fitting over the first sub-fitting such that the first and second sub-fittings are co-axial, welding a first axial end of the second tube to the second sub-fitting, and welding the second sub-fitting to the first sub-fitting. In some embodiments, the method further comprises welding the first tube to a second fitting. In some embodiments, the method further comprises welding the second tube to the second fitting. In some embodiments, the second fitting is an angled, threaded fitting. In some embodiments, the first fitting is a three-flanged fitting.

Aspects of the disclosure are directed to an assembly, comprising: a first fitting that includes a first sub-fitting and a second sub-fitting, a first tube having a first axial end that is welded to the first sub-fitting, and a second tube having a first axial end that is welded to the second sub-fitting, where the first tube is nested within the second tube, where the first sub-fitting is welded to the second sub-fitting. In some embodiments, the assembly further comprises a second fitting, where a second axial end of the first tube is welded to the second fitting, and where a second axial end of the second tube is welded to the second fitting. In some embodiments, the assembly further comprises a channel formed in the second sub-fitting coupled to the second tube and a port. In some embodiments, the channel and the port are configured to convey fluid that is present in a cavity between an inner diameter of the second tube and an outer diameter of the first tube. In some embodiments, the assembly further comprises a first seal, and a second seal located radially outward of the first seal with respect to a longitudinal axis of the assembly, where the port divides the first seal and the second seal. In some embodiments, at least one of the first seal or the second seal is made of at least rubber. In some embodiments, the second sub-fitting includes a divot formed in a surface of the second sub-fitting, where the divot is configured to accommodate a weld torch and provide an area for a weld bead to accumulate. In some embodiments, the second sub-fitting includes a plurality of webs formed around a circumference of a surface of the second sub-fitting. In some embodiments, the plurality of webs includes three webs. In some embodiments, the webs are substantially equidistantly spaced from one another, center-to-center, and where each of the webs consumes approximately fifty degrees of the overall three hundred sixty degree circumference

BRIEF DESCRIPTION OF THE DRAWINGS

The present disclosure is illustrated by way of example and not limited in the accompanying figures in which like reference numerals indicate similar elements. The drawings are not necessarily drawn to scale unless specifically indicated otherwise.

FIGS. 4A-4E illustrate various welding operations being performed in the constructions of a double walled tube assembly.

DETAILED DESCRIPTION

Figure 1:
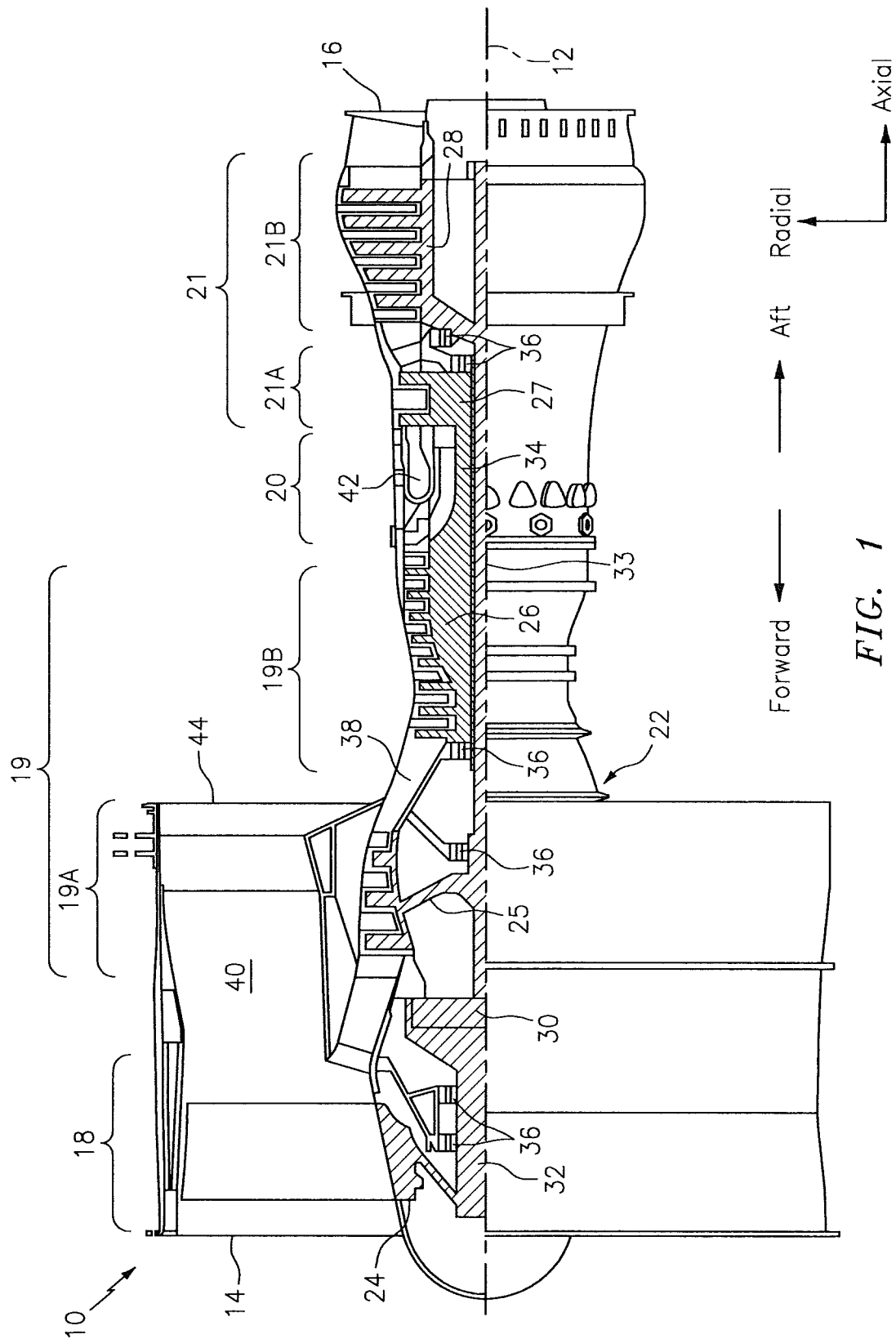
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with aspects of the disclosure, apparatuses, systems, and methods are directed to a double walled tube assembly. The tube assembly may be formed from a double walled tube and one or more fittings. In some embodiments, a fitting may be composed of more than one sub-fitting, such as for example a first (inner) tube sub-fitting and a second (outer) tube sub-fitting. The tube assembly may be constructed using welding operations. In some embodiments, brazing operations might not be used such that the construction of the tube assembly may be termed to be "braze-free".

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks.

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 2A:
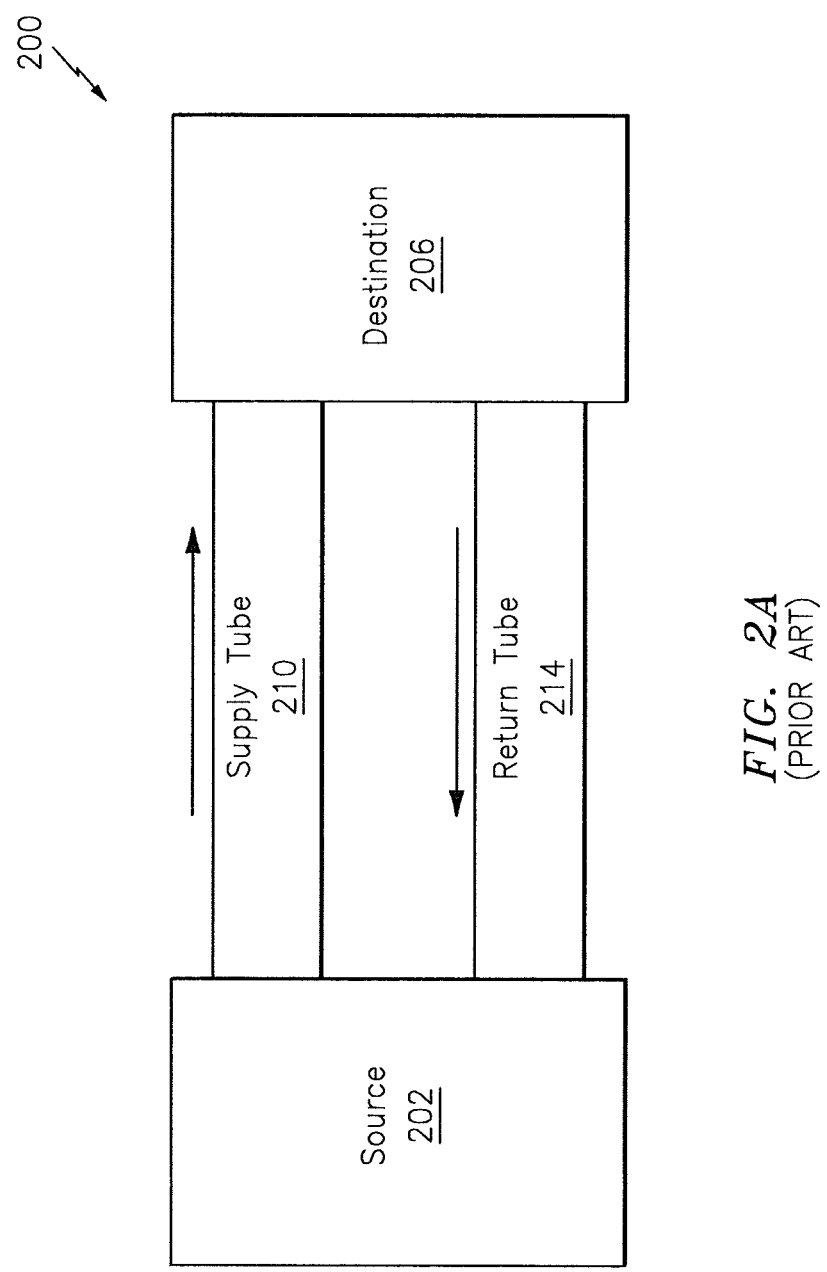
FIG. 2A illustrates a prior art system for circulating a fluid.
Figure 2B:
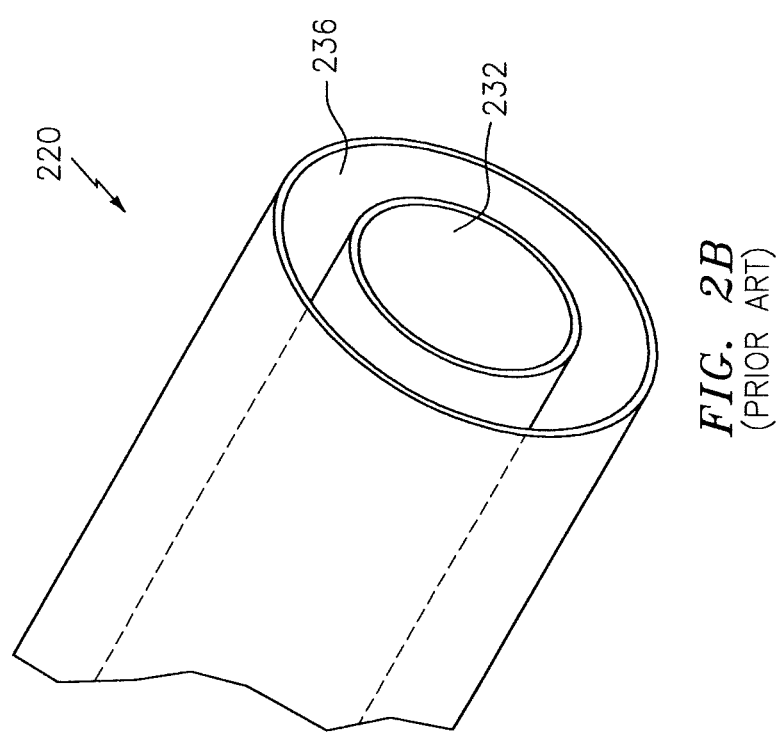
FIG. 2B illustrates a prior art double walled tube.
Figure 2C:
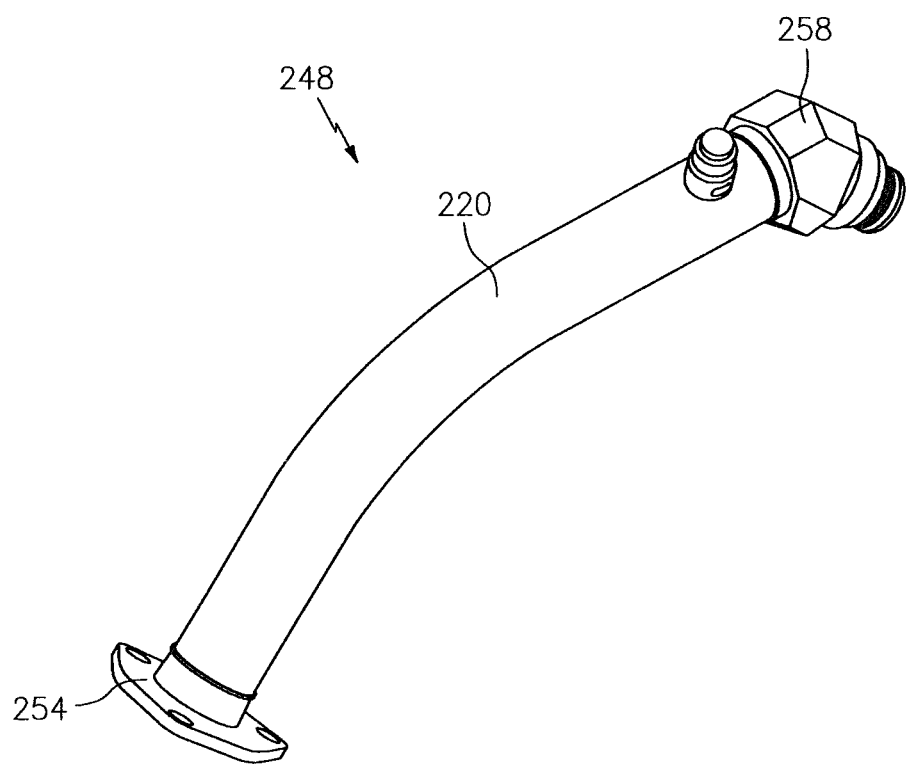
FIG. 2C illustrates a prior art system assembly incorporating a double walled tube and fittings.
Figure 2D:
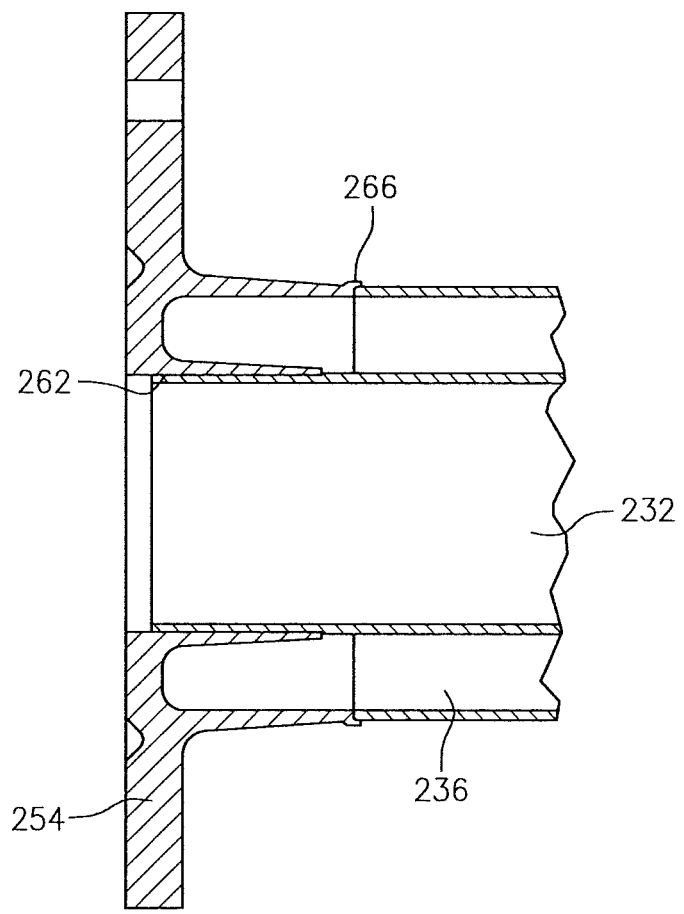
FIG. 2D illustrates an interface between the double walled tube and a fitting of the system of FIG. 2C.
Figure 3C:
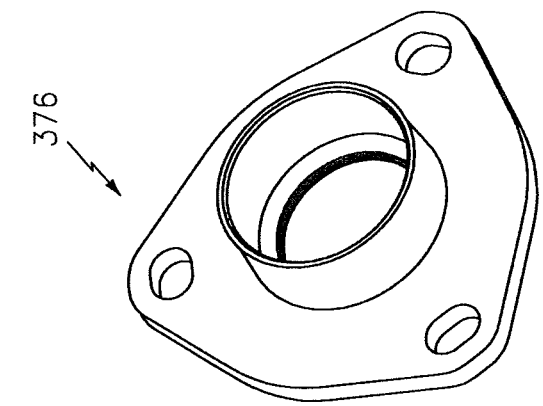
FIG. 3C illustrates an outer tube fitting of the fitting of FIG. 3A.
Figure 3B:
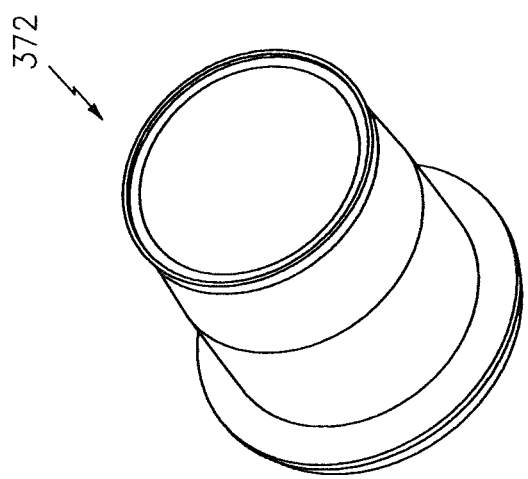
FIG. 3B illustrates an inner tube fitting of the fitting of FIG. 3A.
Figure 3A:
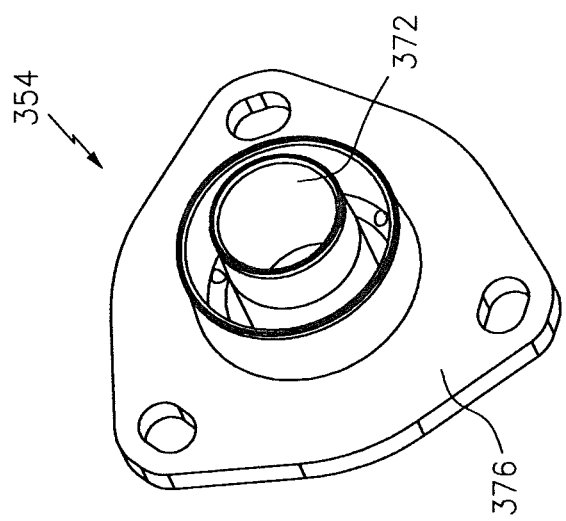
FIG. 3A illustrates a fitting in accordance with aspects of this disclosure.

Referring now to FIG. 3A a multi-piece fitting 354 is shown. As shown in FIGS. 3A-3C, the multi-piece fitting 354 may include an inner tube fitting 372 and an outer tube fitting 376. As shown in FIG. 3A, the outer tube fitting 376 may radially surround the inner tube fitting 372, such that the inner tube fitting 372 is co-axially seated within the outer tube fitting 376. Thus, unlike the fitting 254 of FIGS. 2C-2D, the multi-piece fitting 354 is not a unitary piece. Instead, the fitting 354 is comprised of sub-fittings 372 and 376.

Figure 4E:
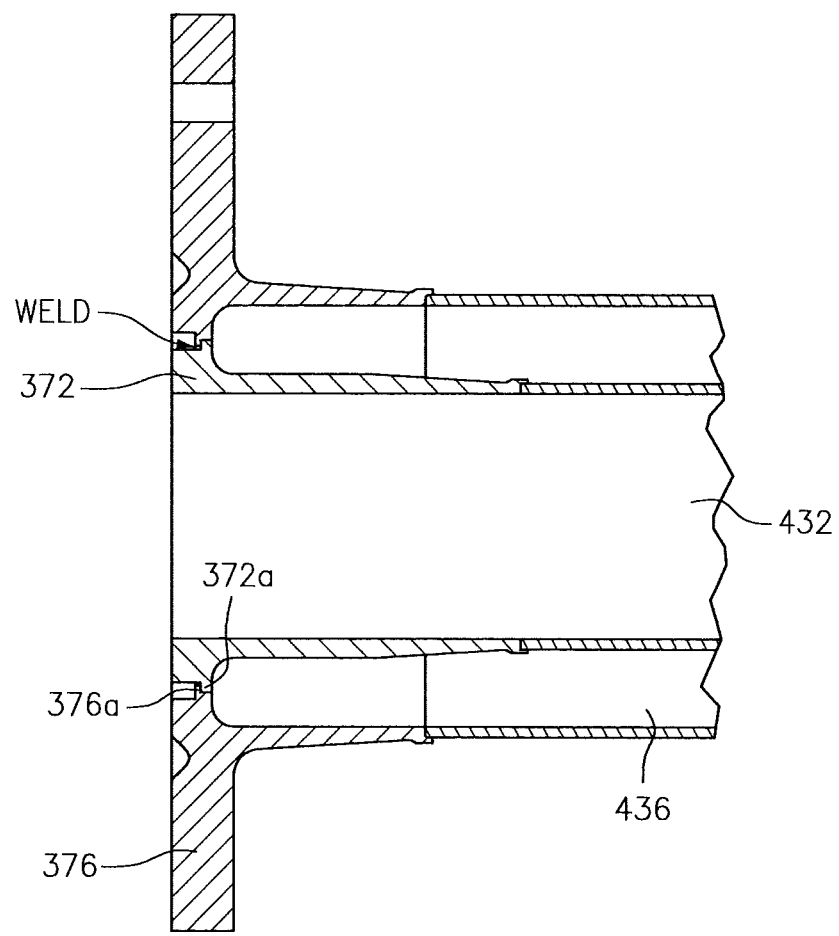
Figure 5:
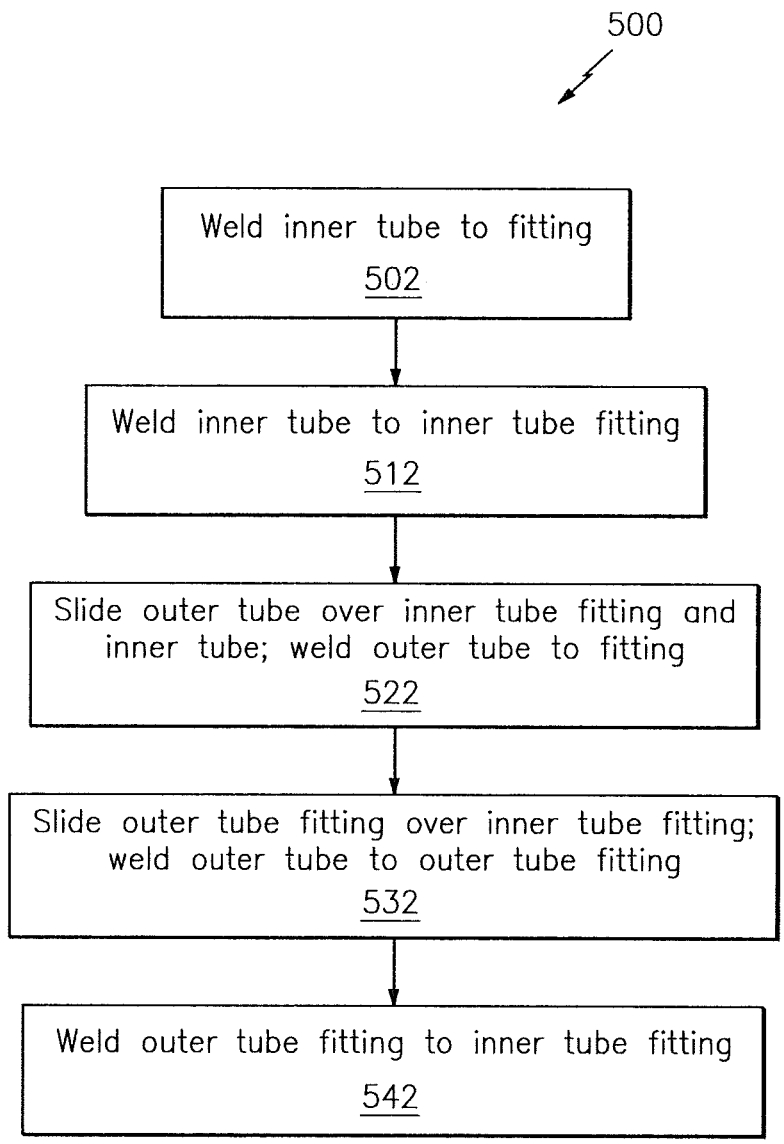
FIG. 5 illustrates a flow chart of a method for constructing a double walled tube assembly in accordance with aspects of this disclosure.

Referring now to FIG. 5 (in view of FIGS. 4A-4E), a flowchart of a method 500 is shown. The method 500 may be used to construct an assembly, such as for example an assembly incorporating a double walled tube with one or more axially attached fittings.

In block 502, a first axial end of an inner tube 432 (which may correspond to the inner tube 232 of FIG. 2B) may be welded to a fitting 258 (see FIG. 4A). The first axial end of the inner tube 432 may abut the fitting 258 such that the weld may occur where they abut In block 512, a second axial end of the inner tube 432 may be welded to an inner tube fitting 372 (see FIG. 4B). The second axial end of the inner tube 432 may abut the fitting 372 such that the weld may occur where they abut.

In block 522, an outer tube 436 (which may correspond to the outer tube 236 of FIG. 2B) may be slid over the inner tube fitting 372 and the inner tube 432 and a first axial end of the outer tube 436 may be welded to the fitting 258 (see FIG. 4C).

In block 532, an outer tube fitting 376 may be slid over the inner tube fitting 372 (see FIG. 4D) such that the outer tube fitting 376 substantially radially surrounds the interior flow path of the inner tube fitting. The inner and outer tube fittings 372, 376 are coaxial. As part of block 532, a second axial end of the outer tube 436 may be welded to the outer tube fitting 376.

In block 542, the outer tube fitting 376 and the inner tube fitting 372 may be welded to one another (see FIG. 4E). The welding of block 542 may be "filler-free" in the sense that, in some embodiments, no additional filler material may be introduced as part of block 542. The mating faces 372a and 376a of the inner tube fitting 372 and the outer tube fitting 376, respectively, may be arranged/oriented to facilitate the welding operation of block 542.

As described above in relation to FIGS. 3A-3C, 4A-4E, and 5, the fitting 354 may be termed a "triple-welded" fitting, as the assembly resulting from the construction may incorporate three welding operations with respect to the fitting 354 (e.g., blocks 512, 532, and 542).

Figure 6:
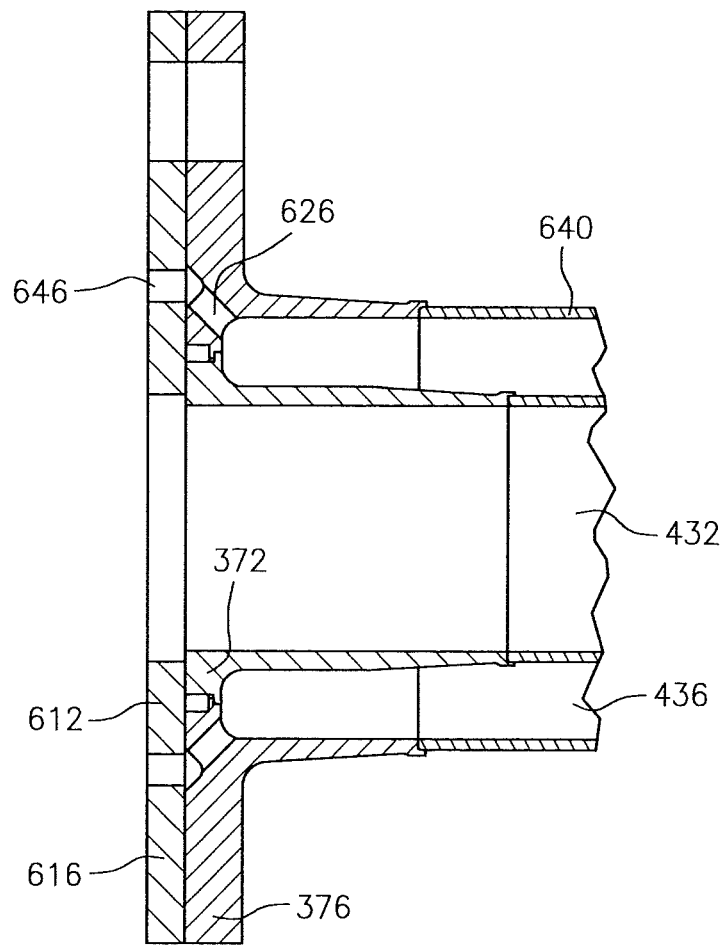
FIG. 6 illustrates a fitting coupled to one or more seals in accordance with aspects of this disclosure.

In some embodiments, it may be desirable/required to enhance the sealing capability associated with a double walled tube assembly. FIG. 6 illustrates an example of such an embodiment. As shown in FIG. 6, an inner seal 612 and an outer seal 616 are shown as having been coupled to the inner tube fitting 372 and the outer tube fitting 376. The seals 612 and 616 may be made of one or more materials, e.g., rubber. The seals 612 and 616 may provide for additional fluid retention capabilities in the event that, e.g., one or more of the weld operations described above in connection with FIG. 5 is compromised. FIG. 6 also shows a channel 626 formed in the outer tube fitting 376 leading to a port 646. The channel 626 and the port 646 may be configured to convey/drain any (leaking) fluid that may be present in a cavity 640 between an inner diameter of the outer tube 436 and an outer diameter of the inner tube 432. The port 646 may bisect/divide the seals 612 and 616 from one another. While described as multiple seals 612 and 616, the seals 612 and 616 may be a unitary piece in some embodiments.

Figure 8:
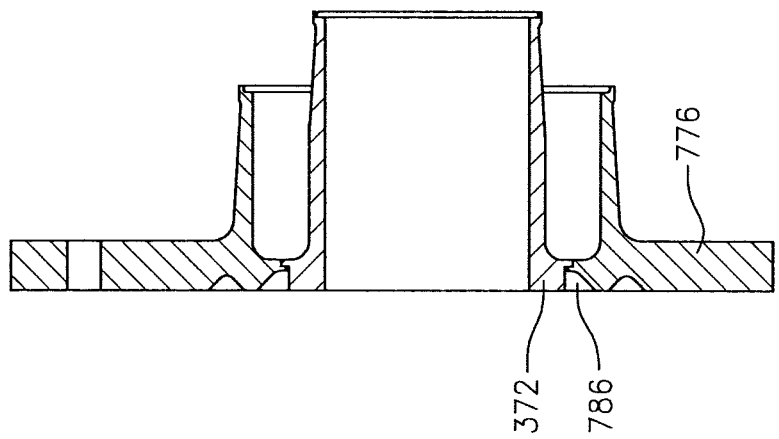
FIG. 8 illustrates the outer tube fitting of FIG. 7 in relation to an inner tube fitting.
Figure 7:
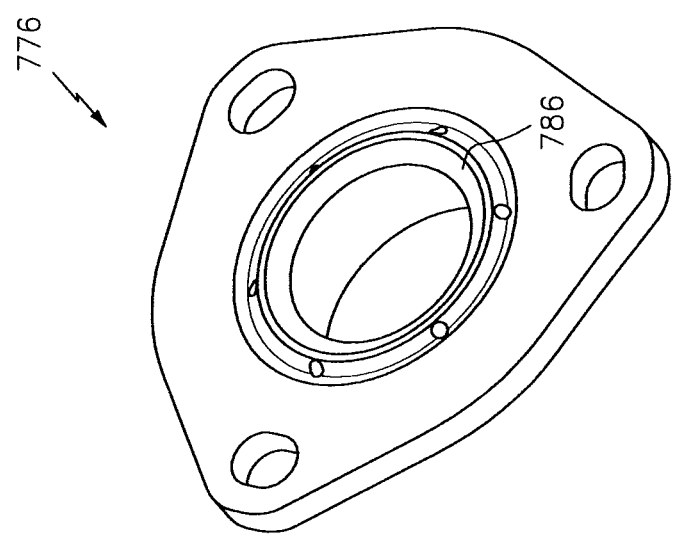
FIG. 7 illustrates an outer tube fitting that incorporates a divot in accordance with aspects of this disclosure.

Referring to FIG. 7, an outer tube fitting 776 is shown. The outer tube fitting 776 is similar to the outer tube fitting 376 of FIG. 3C and may be included as a part of a double-walled tube assembly in a manner similar to what is described above. The outer tube fitting 776 may include a recess/divot 786 formed in a surface of the outer tube fitting 776. The divot 786 may provide additional space to seat/accommodate a weld torch during an assembly procedure, such as for example the method 500 described above (see FIG. 5). This additional space may provide an area for a weld bead to accumulate and may limit interference with a packing seal. FIG. 8 illustrates the outer tube fitting 776 (and associated divot 786) in conjunction with the inner tube fitting 372.

Figure 10:
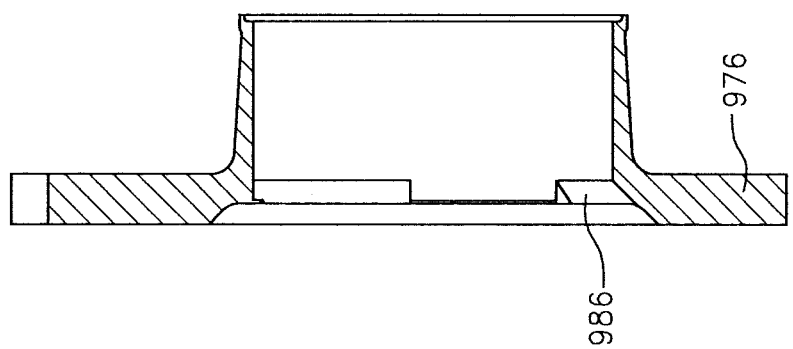
FIG. 10 illustrates another view of the outer tube fitting of FIG. 9.
Figure 9:
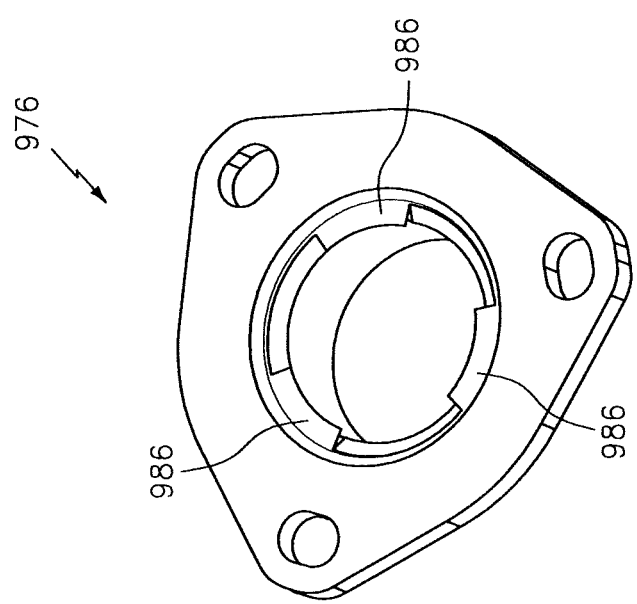
FIG. 9 illustrates an outer tube fitting that incorporates one or more weld lips in accordance with aspects of this disclosure.

Referring to FIG. 9, an outer tube fitting 976 is shown. The outer tube fitting 976 is similar to the outer tube fitting 376 of FIG. 3C and the outer tube fitting 776 of FIG. 7 and may be included as a part of a double-walled tube assembly in a manner similar to what is described above. The outer tube fitting 976 may include a weld lip/web-based design incorporated into a drain channel/port (e.g., channel 626/port 646 of FIG. 6). More specifically, as shown in FIG. 9, one or more weld lips/webs 986 may be present at various circumferential locations (potentially equidistantly spaced, center-to-center) along a surface of the outer tube fitting 976. Each weld lip/web 986 may consume a portion of the overall three hundred sixty degree circumference. For example, each weld lip/web 986 may consume approximately fifty degrees. The weld lips/webs 986 may allow for less heat due to the weld not having to be continuous. Less heat means less potential for weld distortion of fittings and sealing surface(s) of fittings. FIG. 10 illustrates another view of the outer tube fitting 976 (and associated weld lips/webs 986).

Technical effects and benefits of this disclosure include a tube assembly that is less susceptible to leaking fluid relative to conventional tube assemblies. A tube assembly in accordance with aspects of this disclosure is also less complex in terms of the construction of the tube assembly. Brazing operations may be minimized/eliminated thereby reducing the manufacturing costs associated with, e.g., material costs, pre/post brazing operations, inspections, etc.

Aspects of the disclosure have been described in teams of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A method for constructing a double walled tube assembly, comprising:
   welding a first axial end of a first tube to a first sub-fitting of a first fitting;
   sliding a second tube over the first sub-fitting and the first tube;
   sliding a second sub-fitting of the first fitting over the first sub-fitting such that the first and second sub-fittings are co-axial;
   welding a first axial end of the second tube to the second sub-fitting; and
   welding the second sub-fitting to the first sub-fitting,
   wherein the second sub-fitting includes a plurality of webs projecting from an inner surface of the second sub-fitting, each web of the plurality of webs circumferentially spaced from each adjacent web of the plurality of webs, and
   wherein welding the second sub-fitting to the first sub-fitting includes welding only the plurality of webs to the first sub-fitting.

2. The method of claim 1, further comprising:
   welding the first tube to a second fitting.

3. The method of claim 2, further comprising:
   welding the second tube to the second fitting.

4. The method of claim 2, wherein the second fitting is an angled, threaded fitting.

5. The method of claim 1, wherein the first fitting is a three-flanged fitting.

6. The method of claim 1, wherein the second sub-fitting and the first sub-fitting are welded together at a position corresponding to an innermost surface of the second sub-fitting and an outermost surface of the first sub-fitting.

7. The method of claim 1, wherein the plurality of webs includes three webs.

8. The method of claim 1, wherein the webs are substantially equidistantly spaced from one another, center-to-center, and wherein each of the webs consumes approximately fifty degrees of the overall three hundred sixty degree circumference.

9. The method of claim 1, wherein sliding a second tube over the first sub-fitting and the first tube includes radially encompassing at least a portion of each of the first sub-fitting and the first tube with the second tube.

10. The method of claim 1, wherein sliding a second sub-fitting of the first fitting over the first sub-fitting includes radially encompassing at least a portion of the first sub-fitting with the second sub-fitting.

11. An assembly, comprising:
a first fitting that includes a first sub-fitting and a second sub-fitting;
a first tube having a first axial end that is welded to the first sub-fitting; and
a second tube having a first axial end that is welded to the second sub-fitting,
wherein the first tube is nested within the second tube,
wherein the first sub-fitting is welded to the second sub-fitting,
wherein the second sub-fitting includes a plurality of webs projecting from an inner surface of the second sub-fitting, each web of the plurality of webs circumferentially spaced from each adjacent web of the plurality of webs,
wherein the first sub-fitting is welded to the second sub-fitting only between the plurality of webs and the second sub-fitting.

12. The assembly of claim 11, further comprising:
a second fitting,
wherein a second axial end of the first tube is welded to the second fitting, and
wherein a second axial end of the second tube is welded to the second fitting.

13. The assembly of claim 11, further comprising:
a channel formed in the second sub-fitting coupled to the second tube and a port.

14. The assembly of claim 13, wherein the channel and the port are configured to convey fluid that is present in a cavity between an inner diameter of the second tube and an outer diameter of the first tube.

15. The assembly of claim 13, further comprising:
a first seal; and
a second seal located radially outward of the first seal with respect to a longitudinal axis of the assembly,
wherein the port divides the first seal and the second seal.

16. The assembly of claim 15, wherein at least one of the first seal or the second seal is made of at least rubber.

17. The assembly of claim 11, wherein the plurality of webs includes three webs.

18. The assembly of claim 11, wherein the webs are substantially equidistantly spaced from one another, center-to-center, and wherein each of the webs consumes approximately fifty degrees of the overall three hundred sixty degree circumference.

* * * * *